US008571039B2

(12) United States Patent
Strommer et al.

(10) Patent No.: US 8,571,039 B2
(45) Date of Patent: Oct. 29, 2013

(54) ENCODING AND DECODING SPEECH SIGNALS

(75) Inventors: Stefan Strommer, Stockholm (SE); Karsten Vandborg Sorensen, Stockholm (SE); Soren Skak Jensen, Malmo (SE); Koen Vos, San Francisco, CA (US); Jon Bergenheim, Uppsala (SE)

(73) Assignee: Skype, Dublin (IE)

(*) Notice: Subject to any disclaimer, the term of this patent is extended or adjusted under 35 U.S.C. 154(b) by 765 days.

(21) Appl. No.: 12/803,271

(22) Filed: Jun. 23, 2010

(65) Prior Publication Data

US 2011/0137660 A1 Jun. 9, 2011

(30) Foreign Application Priority Data

Dec. 8, 2009 (GB) .................................. 0921462.8

(51) Int. Cl.
*H04L 12/56* (2011.01)

(52) U.S. Cl.
USPC ............ 370/395.61; 370/395.64; 370/395.65; 370/468; 704/201; 704/258; 704/264; 704/278; 704/501

(58) Field of Classification Search
USPC .......... 370/328, 395.61, 395.64, 395.65, 468, 370/525; 704/206, 217, 223, 258, 264, 278, 704/500, 501, 50, 504
See application file for complete search history.

(56) References Cited

U.S. PATENT DOCUMENTS

| | | | | |
|---|---|---|---|---|
| 6,782,367 | B2 * | 8/2004 | Vainio et al. | 704/500 |
| 7,698,132 | B2 * | 4/2010 | Kandhadai et al. | 704/222 |
| 8,019,449 | B2 * | 9/2011 | Barzegar et al. | 700/94 |
| 2002/0136289 | A1 * | 9/2002 | Shukla et al. | 375/232 |
| 2006/0146192 | A1 * | 7/2006 | Tashiro | 348/572 |
| 2009/0073006 | A1 | 3/2009 | Wegener | |
| 2010/0310086 | A1 * | 12/2010 | Magrath et al. | 381/71.11 |

FOREIGN PATENT DOCUMENTS

| | | | |
|---|---|---|---|
| EP | 2 202 883 | A1 | 6/2010 |
| GB | 2 357 682 | A | 6/2001 |
| GB | 2 466 668 | A | 7/2010 |
| WO | WO 01/86635 | A1 | 11/2001 |
| WO | WO 2005/101372 | A1 | 10/2005 |
| WO | WO 2008/031458 | A1 | 3/2008 |

OTHER PUBLICATIONS

Notification of Transmittal of the International Search Report and the Written Opinion of the International Searching Authority for Int'l Application No. PCT/EP2010/069103; Date Mailed: Feb. 25, 2011.
Search Report for GB Application No. GB0921462.8; Date Mailed: Apr. 1, 2011.

* cited by examiner

*Primary Examiner* — Alvin Zhu
(74) *Attorney, Agent, or Firm* — Wolfe-SBMC

(57) ABSTRACT

A method and apparatus for transmitting an audio signal over a communication channel comprising encoding the audio signal with an encoder 204 using a first sampling rate, filtering the audio signal using a first cut off frequency, the first cut off frequency being chosen in dependence upon the first sampling rate, and transmitting the encoded and filtered audio signal over the communication channel. The presence of a condition in which the sampling rate of the encoder 204 is to be switched to a second sampling rate at a switching time is determined and if the condition has been determined to be present, the cut off frequency used in the filtering step is gradually changed from the first cut off frequency to a second cut off frequency, the second cut off frequency being chosen in dependence upon the second sampling rate, such that the audio bandwidth of the transmitted signal changes gradually when the sampling rate is switched to the second sampling rate.

20 Claims, 5 Drawing Sheets

ENCODING AND DECODING SPEECH SIGNALS

RELATED APPLICATION

This application claims priority under 35 U.S.C. §119 or 365 to Great Britain Application No. 0921462.8, filed Dec. 8, 2009. The entire teachings of the above application are incorporated herein by reference.

FIELD OF THE INVENTION

This invention relates to encoding and decoding speech signals, in particular for transmission of the speech signals over a communication channel.

BACKGROUND

A typical packet-based communications network, such as the internet, allows users to communicate with each other using a communication channel in the network. The communication channel can be used to transfer speech signals between users in the network using a protocol such as the Voice over Internet Protocol (VoIP) as is known in the art. This allows the users to have a conversation with each other over the communications network. Speech signals are encoded with a codec at a first user terminal to compress the speech signals before they are transmitted over the communication channel to a second user terminal. At the second user terminal the speech signals are decoded with a codec to output the speech signals to the user. As is known in the art, the encoding and decoding processes include sampling the speech signal at a particular sampling rate. A greater sampling rate will generally result in a higher quality for the speech signal, but the network bandwidth required to transmit the signal will be increased.

The amount of data travelling over the network (i.e. the network load) will vary over time. The network bandwidth available in the network for a particular communication channel changes over time as a consequence of the varying network load as well as other time varying factors.

Some speech codecs, such as hybrid speech codecs, are able to switch between a set of available internal sampling rates. This allows the sampling rate used to encode and decode the speech signals to be dynamically adjusted in real time in dependence upon the current network bandwidth available in the communications network. In this way, the quality of the speech signal can be improved without exceeding the available network bandwidth of the communication channel. The hybrid speech codecs might switch the sampling rate immediately when a switch is desired. Alternatively, the codecs might wait to switch the sampling rate so that the switch is made during a period of speech inactivity. This ensures that the switch takes place when the speech signal is low so that the distortion in the frame in which the switch is carried out is low.

However, switching the sampling rate from a first sampling rate to a second sampling rate can cause a sudden change in the audio bandwidth of the speech signal. A sudden change in the audio bandwidth is noticeable in the speech signal and can be disturbing to the conversation. For the user receiving the speech signals, the sudden change in audio bandwidth is easily detectable and is perceived as a change in the characteristic of the speaker. The sudden change in audio bandwidth is particularly noticeable when the switch in internal sampling rate happens during a short period of speech inactivity, but during a period of high speaker activity, e.g. between two words in a sentence. Furthermore, when background noise is moderate or high, the switch in internal sampling rate will instantaneously change the characteristics of the background noise, thereby making the switch in sampling rates more noticeable in the speech signal.

The present invention has been made in the context of the prior art described above.

SUMMARY

According to a first aspect of the invention there is provided a method of transmitting an audio signal over a communication channel, the method comprising: encoding the audio signal with an encoder using a first sampling rate; filtering the audio signal using a first cut off frequency, the first cut off frequency being chosen in dependence upon the first sampling rate; and transmitting the encoded and filtered audio signal over the communication channel, wherein the method further comprises: determining the presence of a condition in which the sampling rate of the encoder is to be switched to a second sampling rate at a switching time; and if the condition has been determined to be present, gradually changing the cut off frequency used in the filtering step from the first cut off frequency to a second cut off frequency, the second cut off frequency being chosen in dependence upon the second sampling rate, such that the audio bandwidth of the transmitted signal changes gradually when the sampling rate is switched to the second sampling rate.

According to a second aspect of the invention there is provided a method of processing an audio signal, the method comprising: receiving the audio signal over a communication channel; decoding the audio signal with a decoder using a first sampling rate; and filtering the audio signal using a first cut off frequency, the first cut off frequency being chosen in dependence upon the first sampling rate, wherein the method further comprises: determining the presence of a condition in which the sampling rate of the decoder is to be switched to a second sampling rate at a switching time; and if the condition has been determined to be present, gradually changing the cut off frequency used in the filtering step from the first cut off frequency to a second cut off frequency, the second cut off frequency being chosen in dependence upon the second sampling rate, such that the audio bandwidth of the decoded and filtered audio signal changes gradually when the sampling rate is switched to the second sampling rate.

According to a third aspect of the invention there is provided apparatus for transmitting an audio signal over a communication channel, the apparatus comprising: an encoder for encoding the audio signal using a first sampling rate; filtering means for filtering the audio signal using a first cut off frequency, the first cut off frequency being chosen in dependence upon the first sampling rate; transmission means for transmitting the encoded and filtered audio signal over the communication channel; and determining means for determining the presence of a condition in which the sampling rate of the encoder is to be switched to a second sampling rate at a switching time, wherein the apparatus is configured such that if the condition has been determined to be present, the cut off frequency used by the filtering means is gradually changed from the first cut off frequency to a second cut off frequency, the second cut off frequency being chosen in dependence upon the second sampling rate, such that the audio bandwidth of the transmitted signal changes gradually when the sampling rate is switched to the second sampling rate.

According to a fourth aspect of the invention there is provided apparatus for processing an audio signal, the apparatus comprising: receiving means for receiving the audio signal over a communication channel; a decoder for decoding the audio signal using a first sampling rate; filtering means for filtering the audio signal using a first cut off frequency, the first cut off frequency being chosen in dependence upon the first sampling rate; and determining means for determining the presence of a condition in which the sampling rate of the decoder is to be switched to a second sampling rate at a switching time, wherein the apparatus is configured such that if the condition has been determined to be present, the cut off frequency used by the filtering means is gradually changed from the first cut off frequency to a second cut off frequency, the second cut off frequency being chosen in dependence upon the second sampling rate, such that the audio bandwidth of the decoded and filtered audio signal changes gradually when the sampling rate is switched to the second sampling rate.

According to a fifth aspect of the invention there is provided a communications network comprising the apparatus described above, wherein the communication channel is a channel in the communications network.

In embodiments of the invention an audio signal that is input to an encoder is filtered with an adaptive low-pass filter that has a variable cut off frequency. In this way, the highest frequencies in the audio signal can be controlled dynamically. When the encoder switches the internal sampling rate used in the encoding process, the sudden switch in sampling rate is masked by smoothly varying the cut off frequency, such that the audio bandwidth of the encoded audio signal does not suddenly change. Instead, the audio bandwidth of the signal is gradually changed over a period of time (the transition time). In this way, the actual instant where a switch to a different sampling rate in the encoder is unnoticeable. The filtering of the audio signal ensures a soft transition between the audio bandwidth of the signal before and after the switch in sampling rate. The audio signal is for example a speech signal or a music signal.

When switching to a lower sampling rate, the cut off frequency is changed prior to the switching time of the sampling rate, such that the audio bandwidth of the audio signal is reduced to the appropriate level for the new lower sampling rate before the switch occurs.

However, when switching to a higher internal sampling rate the cut off frequency is changed after the switching time. This ensures that the audio bandwidth of the audio signal does not suddenly increase as the sampling rate is increased. During the transition phase the audio bandwidth is slowly increased by increasing the cut off frequency of the filtering process until the audio bandwidth of the signal matches the available audio bandwidth at the new internal sampling rate.

This results in a much more pleasant transition between internal sampling rate modes. The method can be performed at either the transmitting terminal or the receiving terminal in the communications network. In other words, the smoothing of the audio bandwidth transitions can occur at either the encoding or the decoding phase.

In this specification the term "network bandwidth" is used to mean the rate at which data can be transferred over the network, for example over a particular communication channel. The term "audio bandwidth" is used to mean the width of a range of frequencies. The audio bandwidth of the audio signal is a measure of the range of frequency components present in the audio signal.

BRIEF DESCRIPTION OF THE DRAWINGS

For a better understanding of the present invention and to show how the same may be put into effect, reference will now be made, by way of example, to the following drawings in which.

DETAILED DESCRIPTION OF PREFERRED EMBODIMENTS

Figure 1:
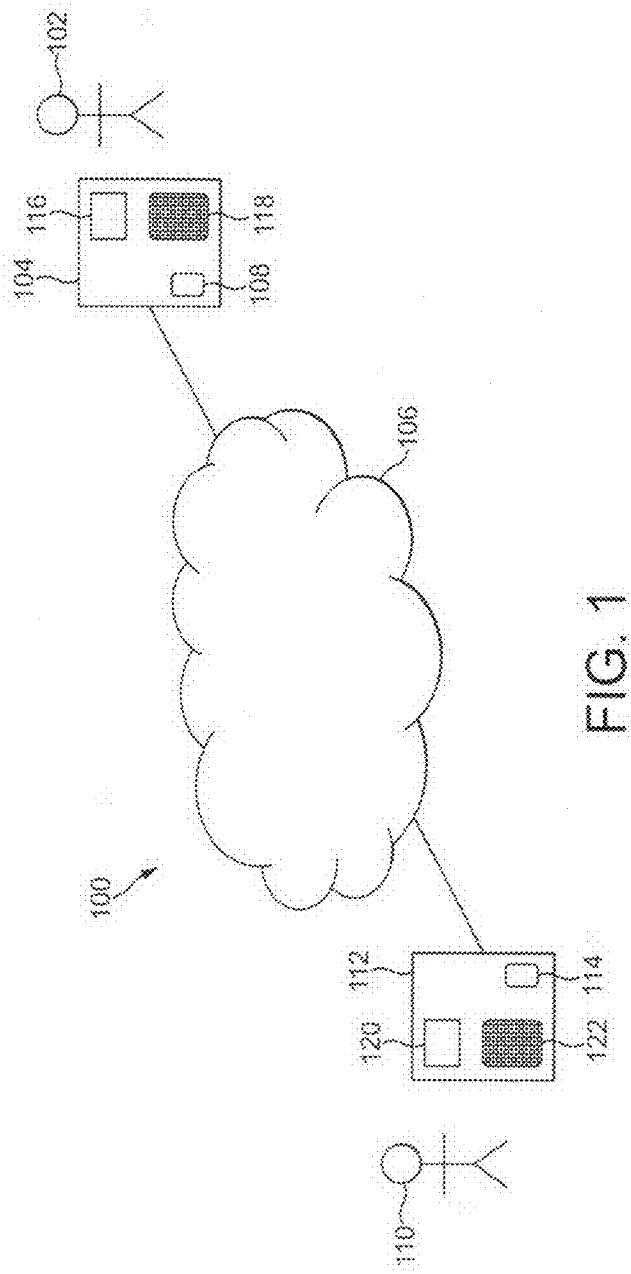
FIG. 1 shows a communications network according to a preferred embodiment.

Reference is first made to FIG. 1, which illustrates a communication system 100 such as a packet-based Peer to Peer (P2P) communication system. A first user 102 of the communication system operates a user terminal 104, which is shown connected to a network 106. The communication system 100 utilises a network such as the Internet. The user terminal 104 may be, for example, a personal computer ("PC") (including, for example, Windows™ Mac OS™ and Linux™ PCs), a mobile phone, a personal digital assistant ("PDA") or other embedded device able to connect to the network 106. The user device 104 is arranged to receive information from and output information to a user 102 of the device. The user terminal 104 comprises a microphone 116 for receiving audio signals from the user 102 and a speaker 118 for outputting audio signals to the user 102. The user terminal 104 might also include a display (not shown) for displaying images to the user 102 and input means such as a keypad or joystick (not shown) for the user 102 to input data to the user terminal 104.

The user terminal 104 is running a communication client 108, provided by a software provider. The communication client 108 is a software program executed on a local processor in the user terminal 104. The communication client 108 allows the user terminal 104 to communicate with other user terminals over the network 106. For example the user terminal 104 can communicate with the user terminal 112 associated with a second user 110. The user terminal 112 is similar to the user terminal 104 in that it includes a communication client 114 for communicating over the network 106, a microphone 120 for the user 110 to input audio signals and a speaker 122 for outputting audio signals to the user 110.

In operation, the user 102 can input audio signals, such as speech signals, to the user terminal 104 using the microphone 116. The client 108 can be used to transmit the speech signals over the network 106 to the client 114 of the user terminal 112. The audio signals can be output to the user 110 via the speaker 122. Similarly, the user 110 can send audio signals to the user 102, whereby the audio signal is received at the microphone 120 and sent to the user terminal 104 over the network using the communication clients 114 and 108. The audio signal is output to the user 102 via the speaker 118.

Figure 2:
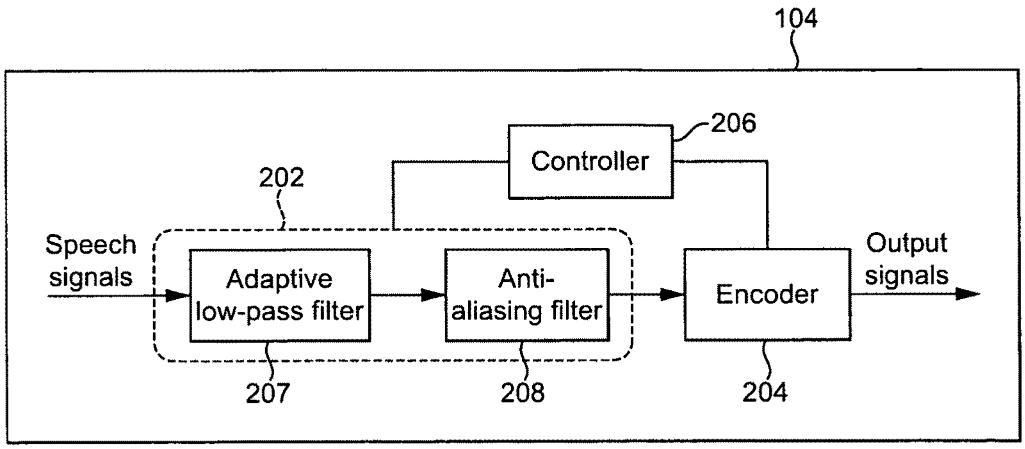
FIG. 2 shows a schematic view of a user terminal for encoding speech signals according to a preferred embodiment.

With reference to FIG. 2, the user terminal 104 comprises a filtering block 202, a speech encoder 204 and a controller 206. In the preferred embodiment described here the filtering block 202, the speech encoder 204 and the controller 206 all run inside a CPU of the user terminal 104. However, in alternative embodiments, the filtering block 202, speech encoder 204 and controller 206 may be implemented in separate hardware blocks inside the user terminal 104. The filtering block 202 comprises an adaptive low pass filter 207 and an anti-aliasing filter 208. The user terminal 104 also comprises other elements but these are not shown in FIG. 2 for clarity. The controller 206 is connected to the filtering block 202 and to the encoder 204. In the preferred embodiment described herein the encoder 204 is a speech encoder used to encode speech signals before transmitting the signals over the network 106. In alternative embodiments a second anti-aliasing filter is implemented in the encoder 204 as well as, or alternatively to, the anti-aliasing filter 208 implemented in the filtering block 202. For example, the encoder 202 may comprise a re-sampler block (not shown in the figures) which comprises the second anti-aliasing filter. Alternatively, the second anti-aliasing filter can be separate from the re-sampler block in the encoder 204. In general an anti-aliasing filter (such as the anti-aliasing filter 208 or the second anti-aliasing filter) can be implemented at any point in the processing sequence between receiving the speech signals at the user terminal 104 and encoding the speech signals in the encoder 204. It can be advantageous to integrate an anti-aliasing filter in either the filtering block 202 or the encoder 204 (or both).

Figure 3A:
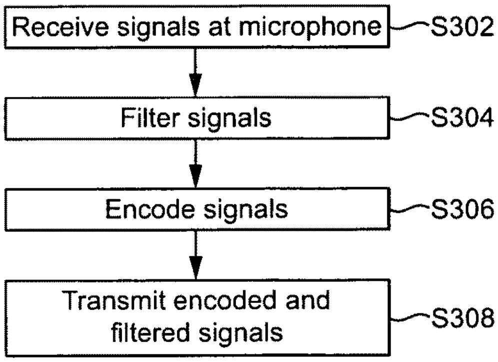
FIG. 3*a* is a flowchart of a process for encoding speech signals according to a preferred embodiment.

The operation of the user terminal 104 when encoding speech signals will now be described with reference to FIGS. 3*a* and 3*b*. In step S302 speech signals are received at the microphone 116 of the user terminal 104 from the user 102. The speech signals are passed to the adaptive low-pass filter 207 in the filtering block 202 as shown in FIG. 2. In step S304 the speech signals are filtered in the adaptive low-pass filter 207. The adaptive low-pass filter 207 can comprise one or more low-pass filters. Each low-pass filter in the adaptive low-pass filter 207 has a cut off frequency, whereby components of the speech signal which have a frequency greater than the cut off frequency are attenuated, whereas components of the speech signal which have a frequency no greater than the cut off frequency are not attenuated (i.e. those components are left substantially unchanged by the adaptive low-pass filter 207). In this way, the high frequency components (the components with frequencies above the cut off frequency) of the speech signal are substantially removed.

The low-pass filtered speech signal is passed to the anti-aliasing filter 208 and then to the speech encoder 204. In step S306 the speech signal is encoded in the speech encoder 204. Prior to encoding, the signal is converted from an analogue to a digital signal (e.g. in a sound card of the user terminal 104) which involves anti alias filtering and sampling of the input. The digital and hence sampled signal is input to the encoder 204. The encoding of the speech signal may involve further down sampling of the speech signal, as is known in the art. The higher the sampling rate the higher is the potential quality of the encoded signal. By sampling the signal at discrete times, some high frequency components of the signal need to be removed for the following reason; According to the Nyquist theorem any frequency components of the signal which have a frequency higher than half of the sampling rate cannot be uniquely represented using that sampling rate. If not removed before sampling, energies at these frequencies will cause aliasing, which distorts the signal. Therefore an anti-aliasing filter such as 208 is needed to attenuate the energy at frequencies higher than half the sampling rate of the encoder 204, also known as the Nyquist frequency. In other words, if $F_i$ is the frequency of the ith frequency component in the signal and $F_S$ is the sampling frequency then components in the signal where $2F_i>F_S$ will be removed by the anti-aliasing filter to avoid aliasing, and thus will not be encoded, but lower frequency components where $2F_i \leq F_S$ will remain, and can be encoded. Although, increasing the sampling rate improves the quality of the speech signal, it also places a greater load on the communication channel.

In step S308 the filtered and encoded speech signals are transmitted over a communication channel in the network 106 between the user terminal 104 and the user terminal 112. Methods of implementing the transmission of the speech signals over the network 106 are known in the art.

As described above, it is advantageous to increase the sampling rate of the encoder 204 to thereby increase the audio bandwidth of the speech signal. However, if the sampling rate of the encoder 204 is increased too much then the network 106 may not be able to transfer the data between the user terminals at an acceptable rate. In other words the network bandwidth available for the communication channel is less than the required network bandwidth for transmitting the encoded speech signals. Furthermore, increasing the sampling rate increases the processing power required to encode and decode the speech signal. Therefore, if the sampling rate is increased too much the user terminal 104 might not have sufficient processing power to encode the speech signal, or the user terminal 112 might not have sufficient processing power to decode the speech signal.

Figure 3B:
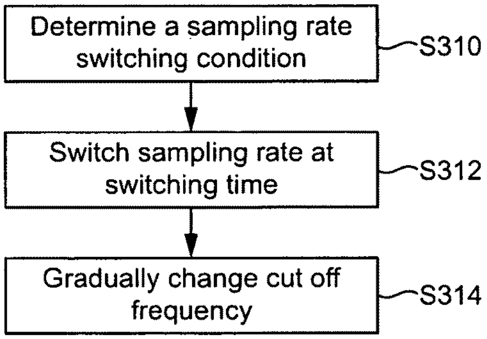
FIG. 3*b* is a flowchart of a process for adapting to changes in the conditions in the network when the network bandwidth increases.

FIG. 3*b* shows a flowchart of a process for adapting to changes in the conditions in the network when the changes lead to a switch to a higher sample rate. In step S310 the user terminal 104 determines the presence of a condition that requires the sampling rate used in the encoder 204 to be switched to a different one of the internal sampling rates. This condition could be due to a change in the network bandwidth available for the communication channel or a change in the computational load on the user terminal 104. If the computational load on the user terminal 112 has changed, the user terminal 112 could send a message to the user terminal 104 requesting that the sampling rate used in the encoder 204 is changed.

The user terminal 104 attempts to optimize the transmission of the speech signal by using a sampling rate in the encoder 204 which is as high as possible without causing problems in relation to the network bandwidth available for the communication channel or the computational load on either the user terminal 104 or the user terminal 112. In step S310 the user terminal 104 also determines a switching time $T_S$ at which the sampling rate of the encoder 204 should be switched. The determination in step S310 is carried out by the controller 206.

In step S312 if the condition has been determined in step S312 such that the sampling rate of the encoder 204 (e.g. the sampling rate used by the re-sampler block of the encoder 204) is to be changed at the switching time $T_S$ then the controller 206 instructs to the encoder 204 specifying one of the internal sampling rates available to the encoder 204. The encoder 204 accordingly switches to the identified sampling rate. In this way the encoding of the speech signal can dynamically adapt to conditions in the network 106 or on the user terminals 104 and 112. Any sampler in the audio path (not only the re-sampler block in the encoder 204) can affect the sampling rate of the encoded signals being output from the encoder 204. The sampling rate of these samplers could also be suddenly switched and embodiments of the invention can be used to compensate for these sudden switches as well as switches in the sampling rate of the re-sampler block in the encoder 204. For example, the sampling rate of a sampler in the sound card could be suddenly switched and the effect on the output audio signals of switching the sampling rate in the sound card can be smoothed out by the adaptive low-pass filter 207 as described herein.

By suddenly changing the internal sampling rate of the speech encoder 204 the range of frequency components that can be included in the encoded signal will suddenly change. For example, if the sampling frequency is suddenly reduced, the Nyquist frequency (i.e. the highest frequency component that can be preserved after sampling the speech signal) will be reduced accordingly. As described above, the Nyquist frequency ($F_N$) is half the sampling rate ($F_S$) of the encoder 204 (i.e. $2F_N=F_S$), such that reducing the sampling frequency reduces the range of frequencies in the speech signal. Therefore, suddenly changing the sampling frequency can suddenly change the audio bandwidth of the speech signal.

However, in the present invention, an adaptive low-pass filter is used, such as adaptive low-pass filter 207 in filtering block 202. In step S314 an instruction is sent from the controller 206 to the filtering block 202 to gradually change the cut off frequency ($F_C$) of the filter(s) in the adaptive low-pass filter 207. The cut off frequency of the filter(s) in the adaptive low-pass filter 207 are gradually changed accordingly. In this way it is possible to control the audio bandwidth of the speech signal such that although the sampling rate used in the encoder 204 is suddenly changed, the audio bandwidth of the speech signal can be gradually changed, such that it is varied smoothly. By smoothly changing the audio bandwidth of the speech signal, the switch in sampling rate used by the encoder 204 is less noticeable in the encoded speech signals.

Figure 4:
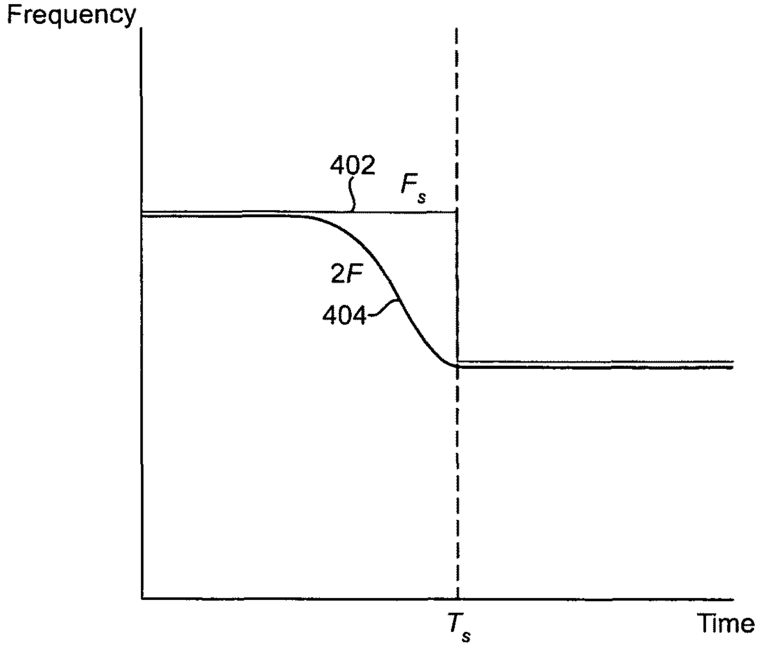
FIG. 4 is a graph showing the sampling rate and cut off frequency as a function of time in a first example.

FIG. 4 shows a graph of Frequency as a function of Time in a first example. The line 402 shows the sampling rate ($F_S$) used by the encoder 204. It can be seen that the sampling rate is switched to a lower sampling rate at the switching time $T_S$. The anti-aliasing filter 208 operates in conjunction with the encoder 204, so when the sampling rate of the encoder 204 switches at time $T_S$, the cut off frequency ($F_{aa}$) of the anti-aliasing filter 208 switches accordingly. The line 404 represents twice the value of the cut off frequency (F) of the filtering block 202. The cut off frequency F of the filtering block 202 is the lower of the cut off frequency of the adaptive low-pass filter 207 ($F_C$) and the cut off frequency of the anti-aliasing filter 208 ($F_{aa}$). In other words, $F=\min(F_C, F_{aa})$. Since frequencies above the Nyquist frequency are not preserved for the particular sampling rate, the cut off frequency (F) applied to the signal in the filtering block 202 before the signal enters the encoder 204 is preferably set just below the Nyquist frequency ($F_N$) of the sampling rate (i.e. $2F\approx F_S$). This can be seen in that the line 404 is not above the sampling rate shown by line 402. Where the sampling rate $F_S$ is constant, the cut off frequency $F_{aa}$ of the anti-aliasing filter 208 is lower than the cut off frequency $F_C$ of the adaptive low pass filter 207. In this way the cut off frequency F of the filtering block 202 equals the cut off frequency $F_{aa}$ of the anti-aliasing filter 208, such that the anti-aliasing filter 208 ensures that the frequency of the signal as it enters the encoder 204 does not exceed the Nyquist frequency of the encoder 204.

Where there is a switch in the sampling rate used by the encoder 204 the cut off frequency (F) of the filtering block 202 is changed from a first frequency at, or near, the Nyquist frequency of the sampling rate before the switching time $T_S$, to a second frequency at, or near, the Nyquist frequency of the sampling rate used in the encoder after the switching time $T_S$. As shown in FIG. 4, when switching down, the cut off frequency $F_C$ of the adaptive low-pass filter 207 is changed gradually from the first frequency to the second frequency prior to the switching time $T_S$. The cut off frequency $F_C$ of the adaptive low-pass filter 207 is varied by altering the coefficients of the filters in the adaptive low-pass filter 207 as described in more detail below.

The cut off frequency (F) of the filtering block 202 finishes changing to the second frequency no later than the switching time $T_S$, such that at the time that the sampling rate is switched, the frequency components that cannot be preserved in the encoded speech signal due to the discrete sampling at the sampling frequency after the switch of the encoding process are already being filtered out by the adaptive low-pass filter 207. Therefore in this example, the cut off frequency $F_C$ of the adaptive low-pass filter 207 is changed prior to the switching time $T_S$ and so in FIG. 3*b*, step S314 occurs before step S312. Therefore, the sudden switching of the sampling rate does not cause a sudden change in the audio bandwidth of the encoded speech signals. This is shown in FIG. 4 in that the line 404 (2F) develops smoothly as a function of time unlike the line 402 ($F_S$).

Figure 5:
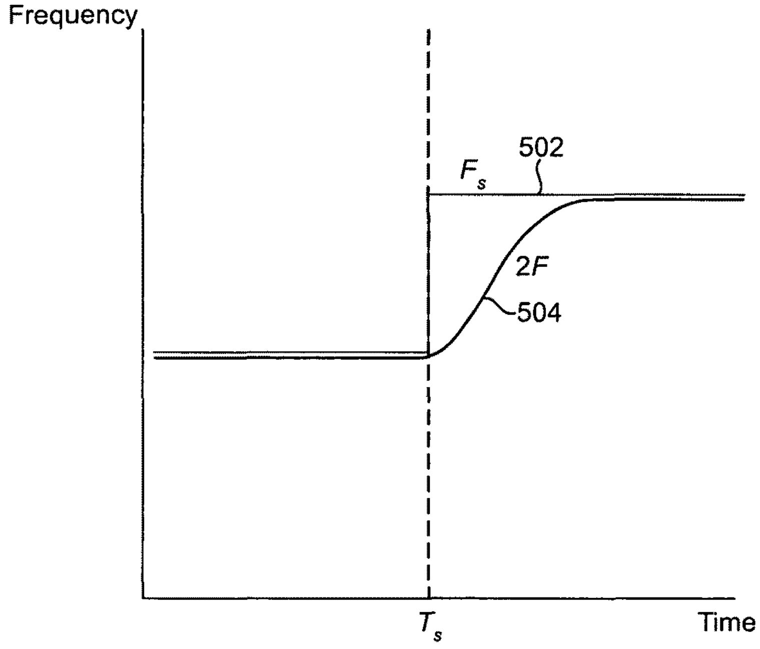
FIG. 5 is a graph showing the sampling rate and cut off frequency as a function of time in a second example.

FIG. 5 shows a second example in which the sampling rate used in the encoder 204 is increased at the switching time $T_S$. In this case the cut off frequency F of the filtering block 202 essentially starts changing no earlier than the switching time $T_S$. In this second example the cut off frequency of the adaptive low-pass filter 207 is changed after the switching time $T_S$ and so in FIG. 3*b*, step S314 occurs after step S312. As in the example shown in FIG. 4 the cut off frequency F changes from a first frequency at, or near, the Nyquist frequency of the sampling rate used in the encoder before the switching time $T_S$ to a second frequency at, or near, the Nyquist frequency of the sampling rate used in the encoder after the switching time $T_S$. The cut off frequency F gradually changes from the first frequency to the second frequency after the switch time $T_S$. In this way, the sudden change in the sampling rate at time $T_S$ does not suddenly introduce extra frequency components into the encoded speech signal because these extra speech components are initially above the cut off frequency $F_C$ of the adaptive low-pass filter 207 and are therefore filtered out of the speech signal. In this way the sudden switching of the sampling rate does not cause a sudden change in the audio bandwidth of the encoded speech signals. This is shown in FIG. 5 in that the line 504 (2F) develops smoothly over time unlike the line 502 ($F_S$). The cut off frequency of the adaptive low-pass filter 207 is gradually increased after the switching time $T_S$ to allow for higher frequency components to be present in the encoded speech signal, thereby improving the quality of the encoded speech signal.

During the transition time the cut off frequency $F_C$ of the adaptive low-pass filter 207 is lower than that of the anti-aliasing filter 208 such that the cut off frequency F of the filtering block 202 is equal to the cut off frequency $F_C$ of the adaptive low-pass filter 207. Therefore by gradually changing the cut off frequency $F_C$ of the adaptive low-pass filter 207 the cut off frequency F of the filtering block 202 can be gradually changed. This enables a smooth transition in the audio bandwidth of the signal. However, apart from the transition time (i.e. when the sampling rate of the encoder 204 is constant) the cut off frequency of the adaptive low-pass filter 207 is higher than (or equal to) that of the anti-aliasing filter 208, such that the cut off frequency F of the filtering block 202 is equal to the cut off frequency $F_{aa}$ of the anti-aliasing filter 208. In this way, the cut off frequency of the filtering block 202 is regulated by the anti-aliasing filter 208 according to the sampling rate of the encoder 204 away from the transition phases. The cut off frequency $F_C$ of the adaptive low-pass filter 207 does not limit the audio bandwidth away from the transition phases. Away from the transition phases the adaptive low-pass filter 207 can be bypassed. Alternatively, as described above, the cut off frequency of the adaptive low-pass filter 207 can be set equal to the cut off frequency $F_{aa}$ of the anti-aliasing filter 208 to take some burden away from the anti-aliasing filter 208. As a second alternative, the adaptive low-pass filter 207 can dual as an anti-aliasing filter such that away from the transition phases it has a cut off frequency of $F_{aa}$. In this second alternative there is no requirement for an anti-aliasing filter since the functions of the anti-aliasing filter are performed by the adaptive low-pass filter 207.

In a preferred embodiment, the adaptive low-pass filter 207 comprises a plurality of filters with pre-calculated filter coefficients such that they have respective cut-off frequencies. The respective cut off frequencies of the filters range from a frequency close to Nyquist frequency of the sampling rate used in the encoder 204 before the switching time $T_S$ to a frequency near the Nyquist frequency of the sampling rate used in the encoder 204 after the switching time $T_S$. Each filter can be described by $N_A$ plus $N_B$ filter coefficients a(n) (with n ranging from 0 to $N_A-1$) and b(n) (with n ranging from 0 to $N_B-1$). Filter coefficients of filters with cut-off frequencies in between the cut off frequencies of the pre-calculated filters can be estimated using an interpolation technique. For example, a linear interpolation technique could be used in which:

$$a(n)=(1-k)a_1(n)+ka_2(n) \text{ with } 0\le k\le 1,$$

where $a_1(n)$ are the filter coefficients of a first of the pre-calculated filters (with a cut off frequency of $f_1$) and $a_2(n)$ are the filter coefficients of a second of the pre-calculated filters (with a cut off frequency of $f_2$) and k is an interpolation constant and is obtained from the desired cut-off frequency $f_k$ using the equation:

$$k=\frac{f_k-f_1}{f_2-f_k} \text{ where } f_1\le f_k\le f_2.$$

Filter coefficients b(n) can be estimated in the same manner, as shown here for a(n).

Figure 6:
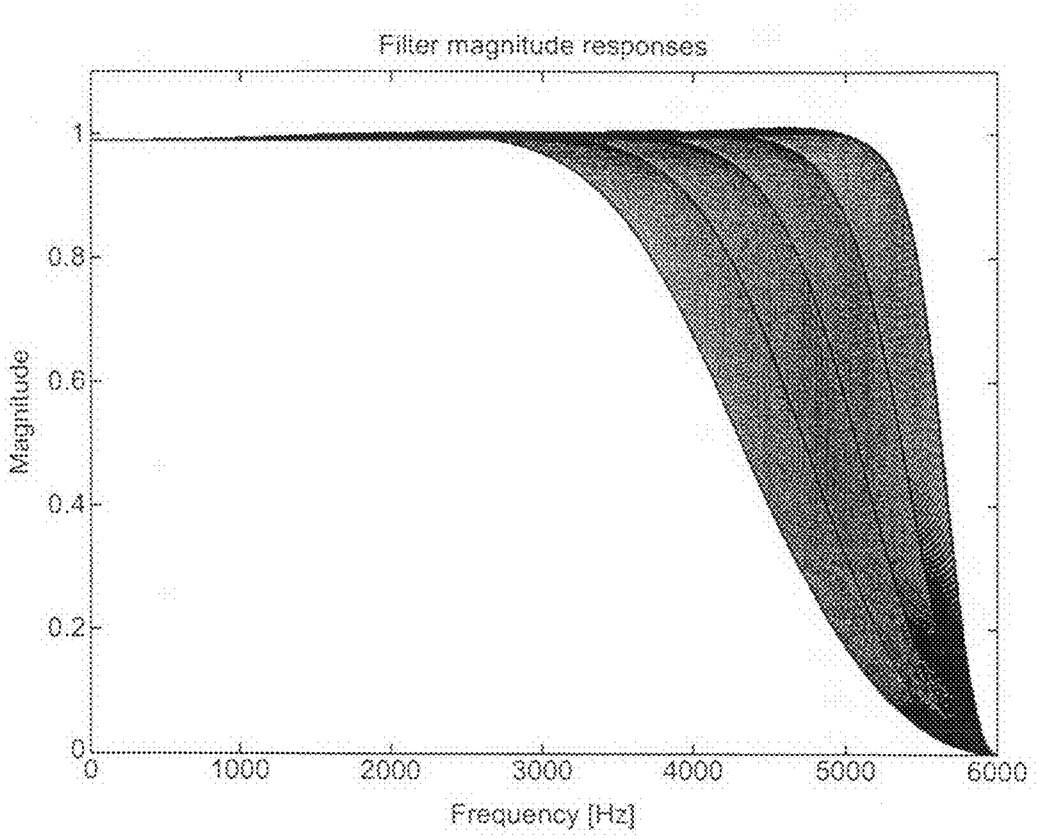
FIG. 6 is a graph showing examples of the magnitude responses of the set of low-pass filters that constitutes a transition phase.

FIG. 6 shows a graph of the magnitude responses of the filters in the adaptive low-pass filter 207 as a function of frequency. The strong black lines in FIG. 6 show the magnitude responses of the pre-calculated filters in the adaptive low-pass filter 207 which have the pre-calculated coefficients. Filters with magnitude responses between those of the pre-calculated filters can be obtained as represented by the shaded regions between the strong black lines in FIG. 6. These filters can be obtained using the pre-calculated filters and a suitable interpolation method (such as the linear interpolation method described above) to arrive at filter coefficients between those of the pre-calculated filters.

In an alternative embodiment, filter coefficients can be calculated directly in real-time to provide filters with the required cut off frequencies. In this way the filter coefficients are calculated more accurately than when using an interpolation method. However, this alternative embodiment usually has a higher computational complexity.

The method can be implemented at the encoder side of the transmission as described above. Alternatively, the method can be implemented at the decoder side of the transmission as further described below with reference to FIGS. 7 and 8.

Figure 7:
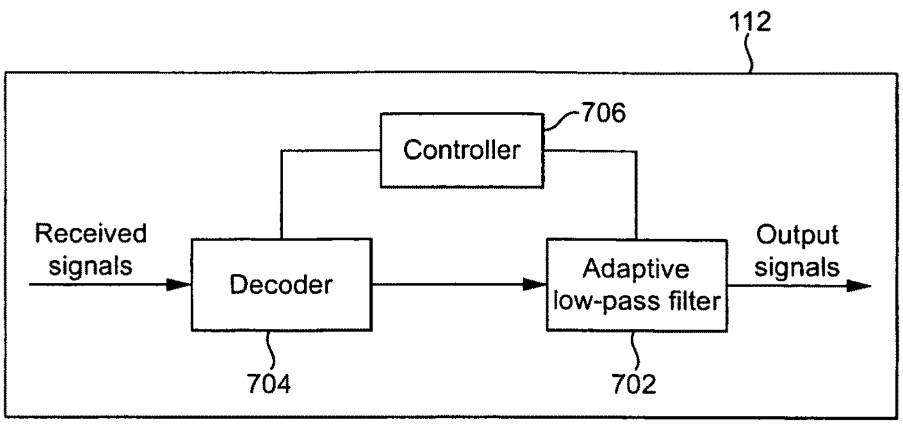
FIG. 7 shows a schematic view of a user terminal for decoding speech signals according to a preferred embodiment.

With reference to FIG. 7, the user terminal 112 comprises an adaptive low-pass filter 702, a speech decoder 704 and a controller 706. In the preferred embodiment described here the adaptive low-pass filter 702, the speech decoder 704 and the controller 706 all run inside a CPU of the user terminal 112. However, in alternative embodiments, the adaptive low-pass filter 702, speech decoder 704 and controller 706 may be implemented in separate hardware blocks inside the user terminal 112. The user terminal 112 also comprises other elements but these are not shown in FIG. 7 for clarity. The controller 706 is connected to the adaptive low-pass filter 702 and to the decoder 704. The decoder 704 is used to decode speech signals (which have been encoded using a speech encoder) before outputting the speech signals to the user 110 via the speaker 122.

Figure 8:
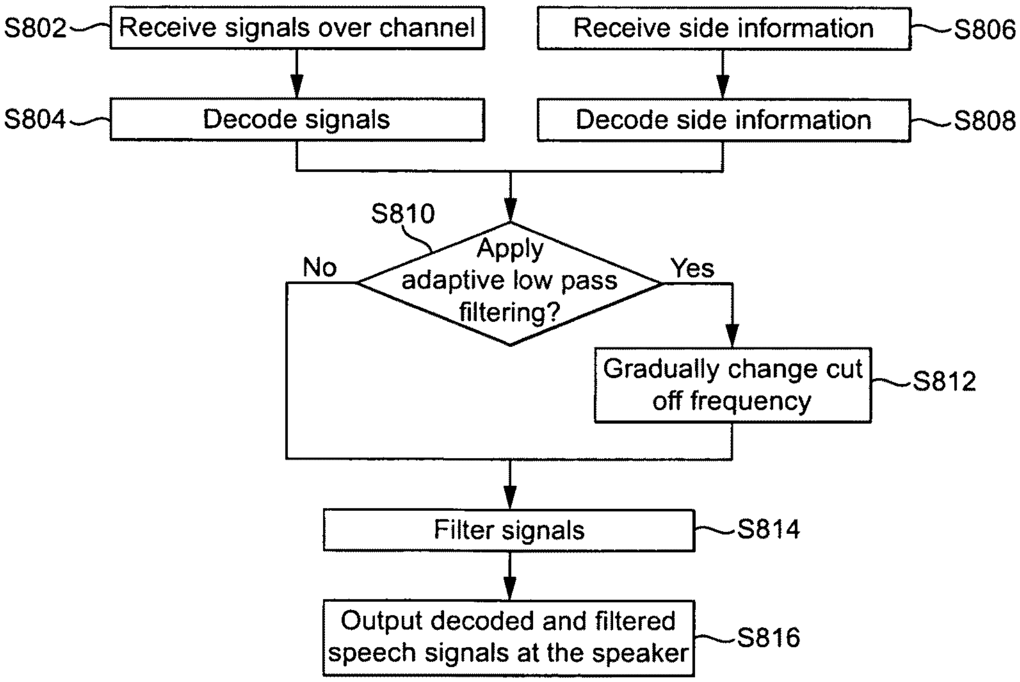
FIG. 8 is a flowchart of a process for decoding speech signals according to a preferred embodiment.

The operation of the user terminal 112 when decoding speech signals will now be described with reference to FIG. 8. In step S802 speech signals are received using the client 114 at the user terminal 112 from the user terminal 104 over the network 106. The received signals are passed to the decoder 704.

In step S804 the speech signals are decoded in the decoder 704. The decoding of the speech signal involves generating the speech signal at a given sampling rate, as is known in the art. The method passes from step S804 to step S810 which is described in more detail below.

In step S806 side information is received at the user terminal 112 over the network 106. The side information is decoded in step S808. The side information can alert the user terminal 112 that a switch in the sampling rate of the signals received in step S802 will occur at a switching time $T_S$.

In step S810 it is determined whether the sampling rate of the received signals either has changed or is about to change. When decoding the signals the decoder 704 can recognize changes in the sampling rate of the received samples and this information is used in step S810 to determine that a sampling rate switch has occurred. The side information received in step S806 can be used in step S810 to determine that the sampling rate of the received signal will switch at some point in the future.

If it is determined that the sampling rate of the received signals either has switched or is about to switch then the method passes to step S812. In step S812 the cut off frequency of the adaptive low-pass filter 702 is gradually changed. In order to achieve this, the controller 706 instructs the adaptive low-pass filter 702 to gradually change its cut off frequency. In accordance with this instruction the adaptive low-pass filter 702 will gradually change its cut off frequency as described above, such that the audio bandwidth of the decoded speech signal is not suddenly changed by the switch in sampling rate in the decoder 704.

In step S814 the speech signals are filtered in the adaptive low-pass filter 702. The adaptive low-pass filter 702 can comprise one or more filters, as described above in relation to adaptive low-pass filter 207. Each filter in the adaptive low-pass filter 702 has a respective cut off frequency. In this way, the high frequency components (the components with frequencies above the cut off frequency) of the speech signal are substantially removed. Once the speech signal has been decoded the filtered and decoded speech signal is output in step S808 to the user 110 using the speaker 122.

As described above the sampling rate switching condition may be a change in the network bandwidth available for the communication channel, or may be a change in the computational load of the user terminal 112 or the user terminal 104. However, usually the sampling frequency of the decoder will match that chosen in the encoder. The sampling frequency of the encoder can be determined at the decoder in step S804 by decoding the received signals. Alternatively the sampling frequency of the encoder can be sent over the network to the decoder user terminal 112 as side information received in step S806.

In this way the cut off frequency applied to the speech signals can be gradually varied at the decoder side of the transmission in order to smoothly vary the audio bandwidth of the speech signals when the sampling rate is switched in the decoder 704.

As described above, the process of adaptive low-pass filtering with gradually changing cut off frequency can be carried out at the transmitting user terminal (where the speech signals are encoded) or at the receiving user terminal (where the speech signals are decoded). If the process is carried out at the transmitting user terminal (user terminal 104), bits will not be spent encoding components of the speech signal that will later be filtered out in the decoder. Thus, the quality of the speech signal at a given bit rate on the communication channel will be higher if the filtering process is carried out at the transmitting user terminal.

As described above, when switching to a lower sampling rate, the cut off frequency of the adaptive low-pass filter 702 is changed before the switching time $T_S$. Where the process is implemented at the receiving user terminal (where the decoding of the speech signal is performed) and the system is switching to a lower sampling rate then side-information is required to be sent to the user terminal 112, indicating when to start changing the cut off frequency of the adaptive low-pass filter 702. If it is not possible to send the required side-information, and the cut off frequency cannot be varied at the encoding user terminal (i.e. if only a decoder implementation is possible), only switches to a higher sampling rate get the full benefit of the current invention (not switches to a lower sampling rate). Switching to a lower sampling rate might still be improved by the current invention by for instance using a buffer at playback side at the cost of delay. This makes most sense in one way communications, such as broadcasting.

When increasing the internal sampling rate, the duration of the transition (i.e. the time period over which the cut off frequency of the filtering block is changed) is chosen as a trade-off between a long transition time which significantly reduces the disturbance caused by a switch in terms of the change in audio bandwidth of the speech signals, and a short transition time where the codec will reach the best possible quality for that specific sampling rate sooner. When switching to a lower internal sampling rate, the duration of the transition is chosen as a trade-off between a long transition time which significantly reduces the disturbance caused by the switch in sampling rate, and a short transition time which reduces the time required to adapt to the new network conditions or CPU conditions. Since the trade-offs differ for up- and down-switching, the transition times may well be chosen independently. By gradually changing the cut-off frequency of the adaptive low-pass filter the audio bandwidth of the speech signal is reduced below the maximum possible audio bandwidth for the duration of the transition phase. This results in suboptimal perceptual quality during the transition phase. It has been determined from experiments that a transition time of approximately three to five seconds mitigates the negative impact of the switching awareness, at a reasonable cost of reduced audio bandwidth and sub-optimal perceptual quality during the transition phase. However, this is a codec dependent setting and should be tuned differently to suit the properties for each particular codec.

In the embodiments described above, the speech signal is filtered (in adaptive low-pass filter 207 or 702) before the speech signal is encoded (in encoder 204) or after it has been decoded (in decoder 704). In alternative embodiments, the filtering is applied to the speech signal in the encoded signal domain, i.e. after encoding and/or before decoding. When applied in one way or another in the encoded signal domain, the audio bandwidth of the speech signal can still be smoothly varied. However, in such embodiments, the encoder/decoder spends some processing power on encoding/decoding some components of the speech signal which will be filtered out by the filtering block. Therefore these alternative embodiments are less desirable than the preferred embodiments described above, but they still have the characteristic that the cut-off frequency is gradually changed to thereby eliminate sudden changes in the audio bandwidth of the speech signal.

By pre-filtering the input signal, or alternatively by post-filtering the output signal, the current invention ensures a smooth audio bandwidth transition when switching internal sampling rate in a speech codec. This approach is perceived as more pleasant sounding than when a switch in sampling rate instantly changes the audio bandwidth.

While this invention has been particularly shown and described with reference to preferred embodiments, it will be understood by those skilled in the art that various changes in form and detail may be made without departing from the scope of the invention as defined by the appendant claims. In particular, the invention is described above in relation to the use of audio signals in a call between users over a VoIP communication system, but the invention may be equally applied to audio signals for use in other scenarios as would be apparent to a skilled person.

For example the invention can be applied to the transmission of music signals across a network. As another example, in the above described embodiments, sudden switches in the sampling rate of the re-sampler used in the encoder 204 are compensated for using the adaptive low-pass filter 207. The same method can be used to smooth out sudden changes in the sampling rate used by any sampler in the audio path (e.g. a sampler in the sound card) that would affect the sampling rate of the signals output from the encoder 204.

The invention claimed is:

1. A method of transmitting an audio signal over a communication channel, the method comprising:

encoding the audio signal with an encoder using a first sampling rate;

filtering the audio signal using a first cut off frequency, the first cut off frequency being chosen in dependence upon the first sampling rate, wherein the step of filtering is performed after the step of encoding; and transmitting the encoded and filtered audio signal over the communication channel, wherein the method further comprises:

determining the presence of a condition in which the sampling rate of the encoder is to be switched to a second sampling rate at a switching time; and if the condition has been determined to be present, gradually changing the cut off frequency used in the filtering step from the first cut off frequency to a second cut off frequency, the second cut off frequency being chosen in dependence upon the second sampling rate, such that the audio bandwidth of the transmitted signal changes gradually when the sampling rate is switched to the second sampling rate.

2. A method according to claim 1 wherein the first cut off frequency is chosen to be substantially equal to the Nyquist frequency of the first sampling rate and the second cut off frequency is chosen to be substantially equal to the Nyquist frequency of the second sampling rate.

3. A method according to claim 1 wherein at least one filter is used in the step of filtering the audio signal, and the cut off frequency used in the filtering step is gradually changed by varying at least one coefficient of the at least one filter.

4. A method according to claim 3 wherein there is a plurality of said filters, the coefficients of the filters being variable and utilizing a first set of coefficients that is pre-calculated such that each filter has a respective pre-calculated cut off frequency, and a second set of coefficients that is obtained using an interpolation method to estimate coefficients with cut off frequencies between the pre-calculated cut off frequencies of the first set.

5. A method according to claim 4 wherein the interpolation method is a linear interpolation method.

6. A method according to claim 3 wherein the at least one coefficient is directly calculated in real-time to provide the at least one filter with a particular cut off frequency.

7. A method according to claim 1 wherein the first sampling rate is greater than the second sampling rate and wherein the cut off frequency used in the filtering step finishes gradually changing to the second cut off frequency no later than the switching time.

8. A method according to claim 1 wherein the first sampling rate is less than the second sampling rate and wherein the cut off frequency used in the filtering step starts gradually changing to the second cut off frequency no earlier than the switching time.

9. A method according to claim 1 wherein the condition is a change in the available network bandwidth on the communication channel.

10. A method according to claim 1 wherein the condition is a change in the computational load available for performing the method steps.

11. A method according to claim 1 wherein the step of determining the presence of a condition comprises receiving information indicating that the sampling rate of the decoder is to be switched to the second sampling rate at the switching time.

12. A method of processing an audio signal, the method comprising:

receiving the audio signal over a communication channel;

decoding the audio signal with a decoder using a first sampling rate; and filtering the audio signal using a first cut off frequency, the first cut off frequency being chosen in dependence upon the first sampling rate, wherein the step of filtering is performed before the step of decoding, wherein the method further comprises:

determining the presence of a condition in which the sampling rate of the decoder is to be switched to a second sampling rate at a switching time; and if the condition has been determined to be present, gradually changing the cut off frequency used in the filtering step from the first cut off frequency to a second cut off frequency, the second cut off frequency being chosen in dependence upon the second sampling rate, such that the audio bandwidth of the decoded and filtered audio signal changes gradually when the sampling rate is switched to the second sampling rate.

13. The method of claim 12 wherein the condition is a change in the sampling rate of the received audio signal.

14. Apparatus for transmitting an audio signal over a communication channel, the apparatus comprising:

an encoder for encoding the audio signal using a first sampling rate;

filtering means for filtering the audio signal using a first cut off frequency, the first cut off frequency being chosen in dependence upon the first sampling rate, wherein the filtering means are configured to be utilized after the audio signal is encoded;

transmission means for transmitting the encoded and filtered audio signal over the communication channel; and determining means for determining the presence of a condition in which the sampling rate of the encoder is to be switched to a second sampling rate at a switching time, wherein the apparatus is configured such that if the condition has been determined to be present, the cut off frequency used by the filtering means is gradually changed from the first cut off frequency to a second cut off frequency, the second cut off frequency being chosen in dependence upon the second sampling rate, such that the audio bandwidth of the transmitted signal changes gradually when the sampling rate is switched to the second sampling rate.

15. The apparatus of claim 14 wherein the filtering means comprises at least one filter, at least one coefficient of the at least one filter being variable to thereby gradually change the cut off frequency of the filtering means.

16. The apparatus of claim 14 wherein the filtering means comprises a plurality of said filters, the coefficients of the filters being variable and utilizing a first set of coefficients that is pre-calculated such that each filter has a respective pre-calculated cut off frequency, and a second set of coefficients that is obtained using an interpolation method to estimate coefficients with cut off frequencies between the pre-calculated cut off frequencies of the first set.

17. The apparatus of claim 14 wherein the communication channel is between two nodes in a communications network.

18. The apparatus of claim 14 wherein the condition is a change in the available network bandwidth on the communication channel.

19. The apparatus of claim 14 wherein the condition is a change in the computational load at the apparatus.

20. Apparatus for processing an audio signal, the apparatus comprising:

receiving means for receiving the audio signal over a communication channel;

a decoder for decoding the audio signal using a first sampling rate;

filtering means for filtering the audio signal using a first cut off frequency, the first cut off frequency being chosen in dependence upon the first sampling rate, wherein the filtering means are configured to be utilized before the audio signal is decoded; and determining means for determining the presence of a condition in which the sampling rate of the decoder is to be switched to a second sampling rate at a switching time, wherein the apparatus is configured such that if the condition has been determined to be present, the cut off frequency used by the filtering means is gradually changed from the first cut off frequency to a second cut off frequency, the second cut off frequency being chosen in dependence upon the second sampling rate, such that the audio bandwidth of the decoded and filtered audio signal changes gradually when the sampling rate is switched to the second sampling rate.

* * * * *